United States Patent
Yeh et al.

(12)

(10) Patent No.: US 12,225,294 B2
(45) Date of Patent: Feb. 11, 2025

(54) AUTOMATIC TRACKING METHOD AND TRACKING SYSTEM APPLIED TO PAN-TILT-ZOOM CAMERA DEVICE

(71) Applicant: Aver Information Inc., New Taipei (TW)

(72) Inventors: Jen-Hung Yeh, New Taipei (TW); Chao-Hung Chang, New Taipei (TW); Yi-Chang Yang, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 91 days.

(21) Appl. No.: 18/163,983

(22) Filed: Feb. 3, 2023

(65) Prior Publication Data

US 2023/0262334 A1    Aug. 17, 2023

(30) Foreign Application Priority Data

Feb. 11, 2022 (TW) .................................. 111105087

(51) Int. Cl.
*H04N 23/695* (2023.01)
*H04N 23/67* (2023.01)

(52) U.S. Cl.
CPC ......... *H04N 23/695* (2023.01); *H04N 23/675* (2023.01)

(58) Field of Classification Search
CPC .... H04N 23/675; H04N 23/61; H04N 23/695; H04N 23/63; H04N 23/69; H04N 23/62; H04N 23/60; H04N 23/698; H04N 23/661; H04N 23/667; G06T 7/20; G06T 7/60; G06T 7/188

USPC ....................................................... 348/222.1
See application file for complete search history.

(56) References Cited

U.S. PATENT DOCUMENTS

| | | | |
|---|---|---|---|
| 9,438,783 B2 * | 9/2016 | Watanabe | H04N 23/635 |
| 10,296,768 B2 * | 5/2019 | Bermudez Rodriguez | |
| | | | G06Q 10/087 |
| 10,594,925 B2 | 3/2020 | Srivastava et al. | |
| 10,649,433 B2 * | 5/2020 | Georgeson | G05B 19/048 |
| 10,798,345 B2 * | 10/2020 | Numata | H04N 23/698 |
| 11,095,823 B2 * | 8/2021 | Takami | H04N 23/695 |
| 11,330,168 B2 * | 5/2022 | Takami | H04N 23/62 |

(Continued)

FOREIGN PATENT DOCUMENTS

| | | |
|---|---|---|
| EP | 2667231 A1 | 11/2013 |
| TW | 201221900 A | 6/2012 |
| TW | 201935911 A | 9/2019 |

*Primary Examiner* — Pritham D Prabhakher
(74) *Attorney, Agent, or Firm* — McClure, Qualey & Rodack, LLP (57) ABSTRACT

An automatic tracking method used in conjunction with a PTZ camera device, wherein an image capturing range of the PTZ camera device is set with a first preset range and a second preset range. The method includes the following steps. Step 1 performs a real-time tracking mode when a target object is within the first preset range, wherein the camera position of a first lens of the PTZ camera device is adjusted with the movement of the target object. Step 2 records an object distance value and perform a region tracking mode when the target object is within the second preset range, which fixes the camera position of the first lens of the PTZ camera device and tracks the target within the second preset range object. Step 3 switches from the region tracking mode to the real-time tracking mode when the object distance of the target object changes.

11 Claims, 8 Drawing Sheets

(56) References Cited

U.S. PATENT DOCUMENTS

| | | |
|---|---|---|
| 11,483,469 B2 * | 10/2022 | Srivastava ............. H04N 23/63 |
| 2006/0126737 A1 | 6/2006 | Boice et al. |
| 2012/0120198 A1 | 5/2012 | Yu et al. |
| 2012/0268608 A1 | 10/2012 | Watanabe |
| 2017/0201723 A1 * | 7/2017 | Kim ....................... H04N 7/181 |
| 2017/0365159 A1 * | 12/2017 | Laufer ................. H04W 4/029 |
| 2019/0132559 A1 | 5/2019 | Numata |
| 2019/0174055 A1 * | 6/2019 | Srivastava ............. H04N 23/62 |
| 2019/0339659 A1 * | 11/2019 | Georgeson ........... G05B 19/048 |
| 2020/0059595 A1 | 2/2020 | Ono |
| 2020/0221054 A1 * | 7/2020 | Carey .................... H04N 5/265 |
| 2020/0244871 A1 * | 7/2020 | Srivastava ............. H04N 23/69 |

\* cited by examiner

AUTOMATIC TRACKING METHOD AND TRACKING SYSTEM APPLIED TO PAN-TILT-ZOOM CAMERA DEVICE

CROSS REFERENCE TO RELATED APPLICATIONS

This Non-provisional application claims priority under 35 U.S.C. § 119 (a) on patent application No. 111105087 filed in Taiwan on Feb. 11, 2022, the entire contents of which are hereby incorporated by reference.

BACKGROUND

1. Technical Field

The invention relates to an imaging device, in particular to an automatic tracking method and an automatic tracking system applied to a pan-tilt-zoom (PTZ) camera device.

2. Description of Related Art

Due to the rapid development of image processing technology, the application of automatically tracking the target object with a camera device and then capturing the image of the target object is more and more widely used in various fields, such as security monitoring, conferences or teaching.

Automatic tracking usually uses the region tracking mode, in which the user sets the tracking region in the image capturing range of the lens. When the target object to be tracked enters the tracking area, the camera device drives its lens on the target object within the tracking area and outputs a corresponding image. The camera drives the lens to another tracking area to continue tracking the target object after the target object disappears in the tracking area due to movement.

Figure 1:
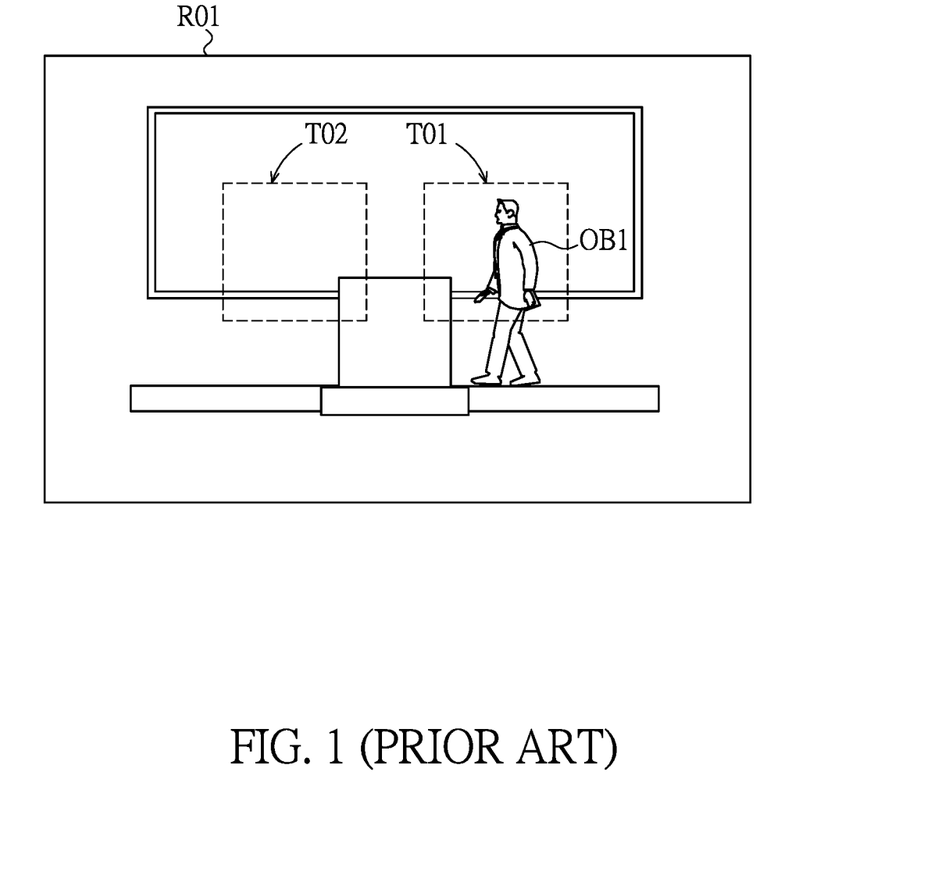
FIG. 1 is a schematic diagram showing an image capturing range suitable for the region tracking mode in the prior art.

However, the region tracking mode has at least one shortcoming. Refer to FIG. 1, the user can set a first tracking area (on the stage) T01 and a second tracking area (on the stage) T02 in the image capturing range R01 of the lens before using the function of the region tracking mode. When the target object OB1 to be tracked moves from the first tracking area T01 to the second tracking area T02, it may happen that the target object OB1 cannot be tracked after leaving the first tracking area T01. Because the region tracking mode switches between two tracking regions but cannot find the target object OB1, the position of the target object OB1 is then lost, which leads to untracking situation.

One of the reasons for the above situation is the improper setting of the tracking areas, for example, an excessive distance is left between the tracking areas when the user sets the tracking areas. It will cause the trace to fail when the target stays too long between tracking areas. It is also possible to increase the load on software and hardware due to setting too many tracking areas and resulting in switching between the tracking areas but not finding the target, resulting the trace to fail. In addition, when the target object OB1 to be tracked is under the stage, the region tracking mode may mistakenly judge that the target object OB1 is in the first tracking area T01 (on the stage) and switch to the first tracking area T01 because part of the target object (such as a face or head) may be displayed in the first tracking area T01.

Therefore, how to provide an automatic tracking method and an automatic tracking system applied to the PTZ camera device to solve the above problems is one of the subject matters.

SUMMARY OF THE INVENTION

In view of the foregoing, an object of the present invention is to provide an automatic tracking method and an automatic tracking system applied to a PTZ camera device, which can automatically select a suitable tracking mode according to the location of the target object.

Another object of the present invention is to provide the automatic tracking method and the automatic tracking system applied to the PTZ camera device, which can achieve a balance between the performance of the software and hardware systems to avoid losing the tracked target object in the case of the system performance is limited.

To achieve the above purpose, the present invention provides the automatic tracking method applied to the PTZ camera device. A first preset range and a second preset range are set in an image capturing range of the PTZ camera device. The automatic tracking method includes the following procedures. First, a real-time tracking mode is performed when a target object is existed in the first preset range, and the image capturing position of a first lens of the PTZ camera device is adjusted following the movement of the target object. Second, recording an object distance value and performing a region tracking mode when the target object is existed in the second preset range. The region tracking mode is to adjust the image capturing position of the first lens of the PTZ camera device and to track the target object in the second preset range. Third, the region tracking mode is switched to the real-time tracking mode when the object distance of the target object is changed.

In one embodiment, wherein the implementation of the real-time tracking mode includes capturing images in the first preset range by the first lens and performing a target recognition from the captured images.

In one embodiment, wherein the object distance value is calculated by the following formula:

$$\text{object distance value} = \text{target area} / \left( 2 \times \tan \frac{\text{horizontal field of view}}{2} \right)$$

Among them, the target area=((constant×1920)/target width pixel value); the unit of the constant is meter, and the range is between 0.3 and 0.6; the target width pixel value is the number of pixels occupied by the target object in the image; and the horizontal field of view is the horizontal field of view of the first lens.

In one embodiment, wherein the first preset range and the second preset range correspond to a set of motor parameters, which drive the first lens to move to the position corresponding to the target object.

In one embodiment, wherein the automatic tracking method further includes capturing an image in the image capturing range by a second lens, and there is a third preset range set in the image capturing range, which corresponds to a coordinate parameter of the second lens.

In one embodiment, wherein the automatic tracking method further includes judging whether to perform the real-time tracking mode or the region tracking mode by the first lens or the second lens.

In one embodiment, wherein when the target object is existed in the third preset range, the method further includes converting the coordinate parameter of the third preset range into a set of motor parameters, which are used to drive the first lens to move to the position corresponding to the target object.

In addition, to achieve the above, the present invention provides an automatic tracking system applied to the PTZ camera device, which includes a first lens, a first image sensing unit, an image processing unit, a microcontroller, a motor driving unit, a focal length adjustment motor, a pan angle adjustment motor, and a tilt angle adjustment motor. The first image sensing unit is disposed opposite to the first lens and transmits an image captured by the first lens. The image processing unit is electrically connected with the first image sensing unit and select to track the target object in a real-time tracking mode or a region tracking mode according to a target object in the image, a preset range where it is located, and an object distance value, and output a computing information. The microcontroller, which is electrically connected with the image processing unit, receives and outputs a control signal according to the computing information. The motor driving unit, which is electrically connected with the microcontroller, outputs a driving signal according to the control signal. The focal length adjustment motor is coupled to the first lens and electrically connected to the motor driving unit. The focal length adjustment motor adjusts the focal length of the first lens according to the driving signal. The pan angle adjustment motor is coupled with the first lens and electrically connected with the motor driving unit. The pan angle adjustment motor drives the first lens to rotate along a first plane. The tilt angle adjustment motor is coupled with the first lens and electrically connected with the motor driving unit. The tilt angle adjustment motor drives the first lens to rotate along a second plane perpendicular to the first plane. Among them, the first lens adjusts its image capturing position following the movement of the target object when the image processing unit selects the real-time tracking mode, and the first lens fixes its image capturing position when the image processing unit selects the region tracking mode.

In one embodiment, wherein the automatic tracking system further includes a memory unit, which is electrically connected with the image processing unit and stores the object distance value, a motor parameter corresponding to the preset range, or a coordinate parameter corresponding to the preset range.

In one embodiment, wherein the automatic tracking system further includes a second lens and a second image sensing unit. The second image sensing unit is disposed opposite to the second lens and electrically connected with the image processing unit. The second image sensing unit transmits an image captured by the second lens to the image processing unit, and the image processing unit selects the real-time tracking mode or the region tracking mode to track the target object according to the image captured by the second lens.

In one embodiment, wherein the second lens is a panoramic lens.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DETAILED DESCRIPTION

In the following description, this invention will be explained with reference to embodiments thereof. However, the description of these embodiments is only for purposes of illustration rather than limitation.

In the embodiment, an element is referred to as "coupled", it may mean "electrically coupled". "Coupled" may be used to indicate a direct or indirect electrical or telecommunication coupling between two or more elements, it can also be used to indicate that two or more elements cooperate or interact with each other.

Figure 2:
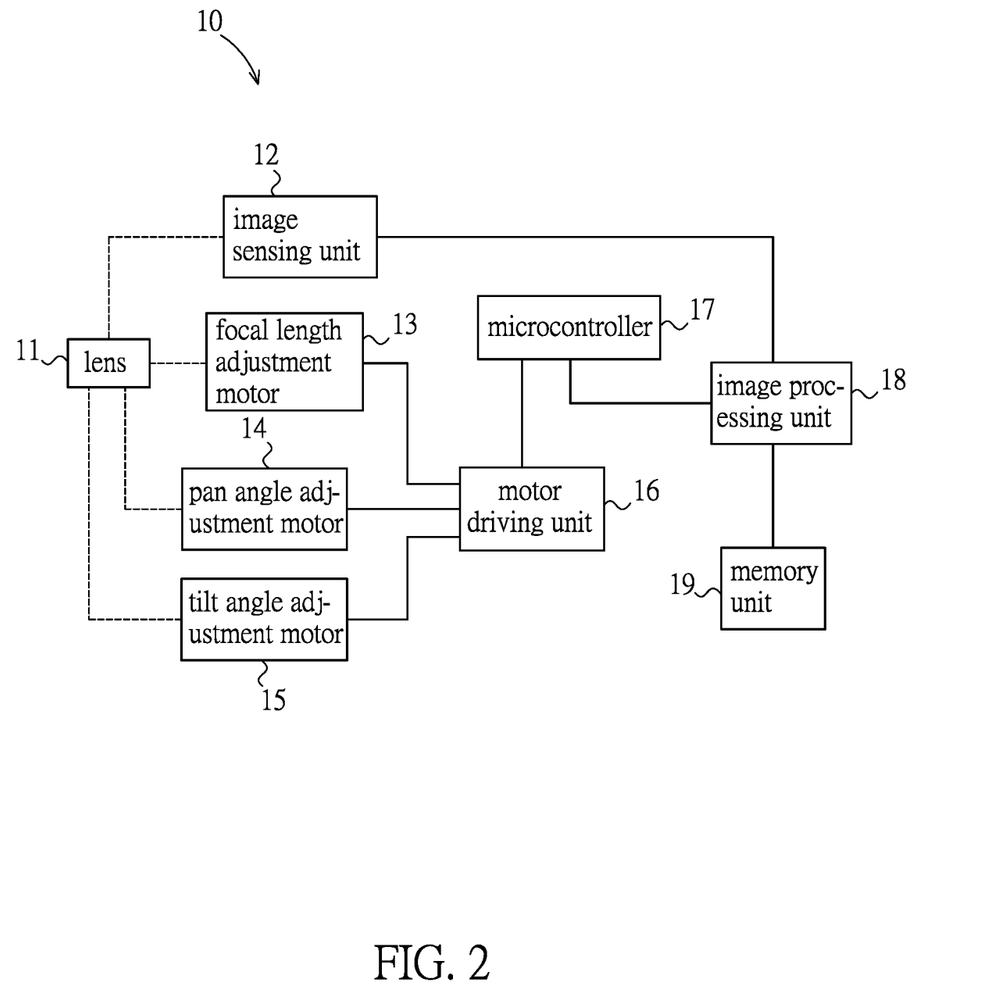
FIG. 2 is a schematic diagram showing a hardware architecture of an automatic tracking system applied to a PTZ camera device according to the first embodiment of the invention.
Figure 3:
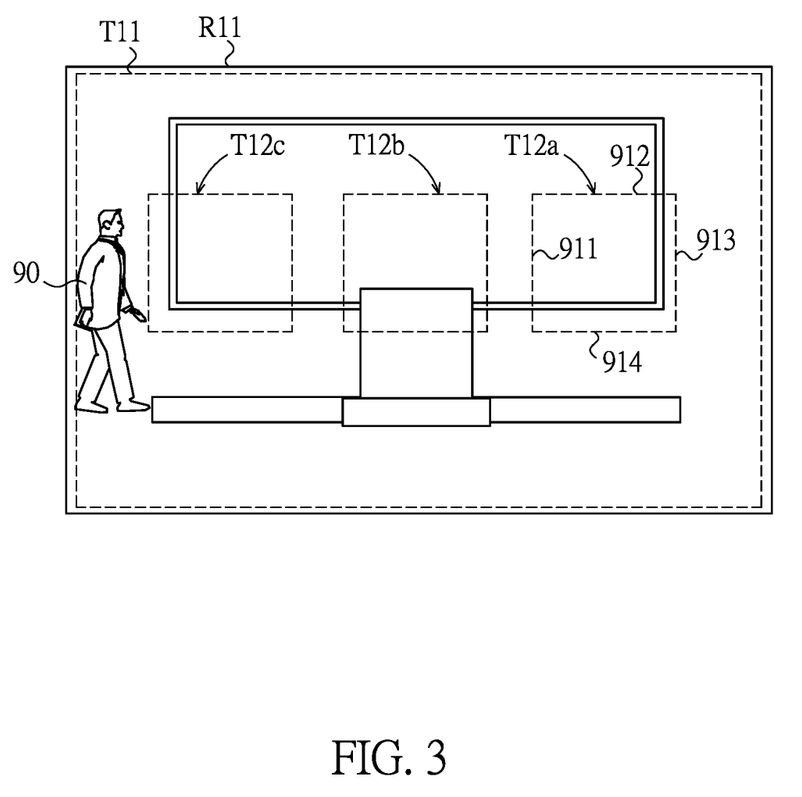
FIG. 3 is a schematic diagram showing an application scenario of the automatic tracking method applied to the PTZ camera device.
Figure 4:
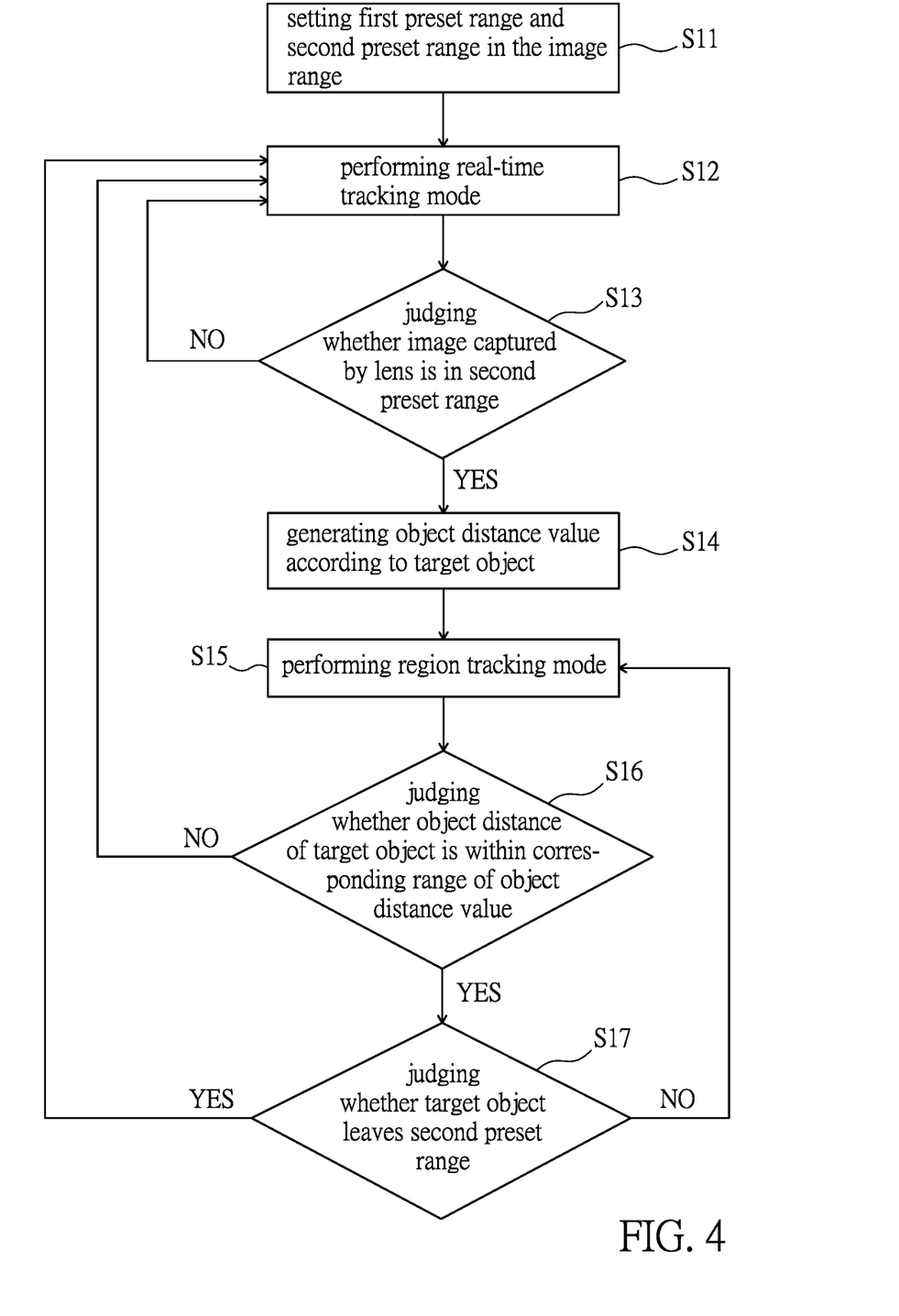
FIG. 4 is a flowchart showing the automatic tracking method applied to the PTZ camera device according to the first embodiment of the invention.

FIG. 2 is a schematic diagram of a hardware architecture of the automatic tracking system applied to the PTZ camera device according to the first embodiment of the invention. FIG. 3 is a schematic diagram of an application scenario of the automatic tracking method applied to the PTZ camera device. FIG. 4 is a flowchart of the automatic tracking method applied to the PTZ camera device according to the first embodiment of the invention.

As shown in FIG. 2, the automatic tracking system 10 applied to the PTZ camera device includes a lens 11, an image sensing unit 12, a focal length adjustment motor 13, a pan angle adjustment motor 14, a tilt angle adjustment motor 15, a motor driving unit 16, a microcontroller 17, an image processing unit 18, and a memory unit 19. The lens 11, the image sensing unit 12, the focal length adjustment motor 13, the pan angle adjustment motor 14, the tilt angle adjustment motor 15, the motor driving unit 16, and the microcontroller 17 can constitute a PTZ camera device. In other embodiments, the PTZ camera device may also include the image processing unit 18 and/or the memory unit 19 in addition to the above units.

The lens 11 is coupled with the image sensing unit 12 and the focal length adjustment motor 13, respectively. The lens 11 is disposed opposite to the image sensing unit 12, and the light is imaged on the image sensing unit 12 after passing through the lens 11 and then recorded. In addition, the lens 11 is a zoom lens and the focal length of the lens 11 can be adjusted through the focal length adjustment motor 13. Furthermore, the pan angle adjustment motor 14 and the tilt angle adjustment motor 15 are also coupled to the lens 11, respectively. The pan angle adjustment motor 14 can drive the lens 11 to rotate along a first plane and the tilt angle adjustment motor 15 can drive the lens 11 to rotate along a second plane. Herein, the first plane is perpendicular to the second plane, wherein the first plane is, for example, the ground plane. In other embodiments, the lens 11, the image sensing unit 12, and the focal length adjustment motor 13 can constitute a PTZ camera unit. The pan angle adjustment motor 14 and the tilt angle adjustment motor 15 are also respectively coupled to the PTZ camera unit. The pan angle adjustment motor 14 can drive the PTZ camera unit to rotate along the first plane, and the tilt angle adjustment motor 15 can drive the PTZ camera unit to rotate along the second plane.

The motor driving unit 16 is electrically connected to the microcontroller 17, the focal length adjustment motor 13, the pan angle adjustment motor 14, and the tilt angle adjustment motor 15, respectively. The motor driving unit 16 outputs the corresponding driving signal to the focal length adjustment motor 13, the pan angle adjustment motor 14, and the tilt angle adjustment motor 15 according to a control signal output by the microcontroller 17 and then controls the focal length, horizontal angle, and tilt angle of the lens 11 to capture the corresponding image. In other embodiments, the focal length adjustment motor 13, the pan angle adjustment motor 14, and the tilt angle adjustment motor 15 may also be individually electrically connected to the corresponding motor driving unit. In other words, each motor may have an independent motor driving unit.

The image processing unit 18 is electrically connected with the image sensing unit 12, the microcontroller 17, and the memory unit 19 respectively. The memory unit 19 may store the application program to be performed, the setting data, or the algorithm (such as an automatic tracking algorithm). The image processing unit 18 may perform the application program stored in the memory unit 19, and then output the computing information to the microcontroller 17 after calculating or analyzing the image output by the image sensing unit 12, and thereby outputting the control signal accordingly. The computing information may include but not limited to the identification result of the target object and the analysis result of the position of the target object in the image.

The embodiment is an example where the automatic tracking system 10 applied to the PTZ camera device is applied to a teaching situation in a classroom. The following describes the automatic tracking method applied to the PTZ camera device according to the first embodiment of the present invention. Referring to FIG. 2 to FIG. 4, the automatic tracking method applied to the PTZ camera device in the first embodiment includes steps S11 to S17. Firstly, it should be noted that an automatic tracking program includes a real-time tracking mode and a region tracking mode. In addition, FIG. 3 is used to illustrate the maximum image area R11 that can be captured by the automatic tracking system 10 applied to the PTZ camera device. The image area R11 is the maximum range that the lens 11 can capture after being driven by the focal length adjustment motor 13, the pan angle adjustment motor 14, and the tilt angle adjustment motor 15. In other words, under normal conditions, such as the real-time tracking mode or the region tracking mode, an image captured by the lens 11 is a partial image of the image area R11, and the image refers to an image captured by the image sensing unit 12 after the light passes through the lens 11 and then recorded.

Step S11 is to set a first preset range T11 and three second preset ranges T12a, T12b, T12c in the image area R11. The second preset range T12a, T12b, T12c are respectively existed in the first preset range T11. Among them, the first preset range T11 is the range to use the real-time tracking mode and the second preset range T12a, T12b, T12c is the range to use the region tracking mode. In other embodiments, the amount of the first preset range and the second preset range can be determined by the user.

The user can select and set the first preset range T11 and the second preset range T12a, T12b, T12c in the image area R11 through the human-machine interface. The first preset range T11 and the second preset range T12a, T12b, T12c can be selected and set by touch control or mouse. In addition, for the action of frame selection, the user can select a range by dragging on the corresponding target position on the display screen or tap and click the target position to select a range with a preset size. It should be noted that since the image area R11 is greater than the image capturing range of the lens 11, the setting of the first preset range T11 and the second preset range T12a, T12b, T12c can be controlled by controlling the focal length adjustment motor 13, the pan angle adjustment motor 14, and the tilt angle adjustment motor 15, and after adjusting the position of the lens 11, the frame selection and setting are performed.

It should be noted that in the embodiment, each of the first preset range T11 and the second preset range T12a, T12b, T12c corresponds to a motor parameter, which includes a horizontal field of view and a vertical viewing angle obtained by converting the coordinate parameters of the pan angle adjustment motor 14 and the tilt angle adjustment motor 15 and the coordinate parameter of the focal length adjustment motor 13. In other words, the motor parameter is a set of motor parameters. Taking the second preset range T12a as an example, it is composed of a first side 911, a second side 912, a third side 913, and a fourth side 914. The first side 911 may correspond to a first parameter value of the pan angle adjustment motor 14, the third side 913 may correspond to a second parameter value of the pan angle adjustment motor 14, the second side 912 may correspond to a first parameter value of the tilt angle adjustment motor 15, and the fourth side 914 may correspond to a second parameter value of the tilt angle adjustment motor 15. The image of the second preset range T12a also corresponds to the horizontal field of view and vertical viewing angle converted by the coordinate parameter of the focal length adjustment motor 13, so that a target object 90 to be tracked is placed in the center of the image with an appropriate size. The above parameter values may correspond to include but not limited to the position of the motor gear, the number of rotations of the motor, the corresponding coordinates of the motor, or other information that can be used to determine whether the motor corresponds to the image.

Step S12 is to perform the real-time tracking mode, which is to capture images in the first preset range T11 by the lens 11 and perform a target recognition program on the captured images by the image processing unit 18. In the embodiment, the target object 90 to be tracked is a person, so the image processing unit 18 may perform a human shape recognition program or a face recognition program. It means that someone appears in the first preset range T11 when the recognition result is "Yes". At this time, the automatic tracking system 10 will keep tracking the target object 90 and make the lens 11 move with the target object 90 by controlling the focal length adjustment motor 13, the pan angle adjustment motor 14, and the tilt angle adjustment motor 15.

Step S13 is to judge whether the image captured by the lens 11 is existed in the second preset range T12a, T12b, T12c, step S14 is performed when the judgment result is "Yes" and step S12 is performed when the judgment result is "No". Since the lens 11 moves along with the target object 90, when the image captured by the lens 11 enters one of the second preset ranges T12a, T12b, T12c, it also means that the target enters one of the second preset ranges. In the embodiment, the focal length adjustment motor 13, the pan angle adjustment motor 14, and the tilt angle adjustment motor 15 are controlled by the microcontroller 17, so the microcontroller 17 can obtain the result that the position of the image captured by the lens 11 corresponds to which position in the image area R11 according to the motor parameter of the current focal length adjustment motor 13, pan angle adjustment motor 14, and tilt angle adjustment motor 15.

Step S14 is to generate an object distance value according to the target object 90. Step S15 is performed after storing the object distance value in the memory unit 19. The embodiment is described by taking the target object 90 moving and entering the second preset range T12c as an example, so in this step, the object distance value is the object distance when the target object 90 enters the second preset range T12c. The object distance value can be obtained by the following formula:

$$ODV = TR / \left(2 \times \tan \frac{HFOV}{2}\right) \quad \text{formula (1)}$$

wherein, ODV is the object distance value, TR is the target area, and HFOV is the horizontal field of view.

Among them, the target area=((0.45×1920)/target width pixel value); the horizontal field of view (HFOV) means that the motor parameter of the focal length adjustment motor 13 corresponds to the horizontal field of view of the lens 11 when the object distance value is obtained.

Among them, the target area (or called shooting area) indicates the actual physical width corresponding to the target in the image captured by the lens 11; 0.45 is a constant and the unit is meter (m) and can also be set as any number between 0.3-0.6 in other embodiments; 1920 is the horizontal pixel value representing the resolution of the image sensing unit 12 (for example, the resolution is 1920×1080); the target width pixel value indicates the number of pixels occupied by the target object 90 in the image.

Step S15 is to perform the region tracking mode. In the embodiment, the region tracking mode is to make the lens 11 capture images in the second preset range T12c and keep tracking the target object 90 but do not make the focal length adjustment motor 13, the pan angle adjustment motor 14, and the tilt angle adjustment motor 15 operate so as to fix the position of the image captured by the lens 11 corresponding to the second preset range T12c. It should be noted that in the region tracking mode, the lens 11 will not follow the larger body movements of the target object 90 so as to make the output image more stable. In other words, when performing the region tracking mode, it is based on the second preset range T12c to adjust the position of the image captured by the lens 11 accordingly and to perform the target recognition program (such as human shape recognition program or face recognition program) on the captured image to detect target without changing the action of the focal length adjustment motor 13, the pan angle adjustment motor 14, and the tilt angle adjustment motor 15, and step S16 is then performed.

Step S16 is to judge whether the object distance of the target object 90 is within a corresponding range of the object distance value. Step S17 is then performed when the judgment result is "Yes" and step S12 is re-performed when the judgment result is "No". To further explain, the corresponding range of the object distance value can be a default value or set by the user. The object distance value is a proportional range that takes the object distance value as the center value and increases or decreases, such as but not limited to ±10% range. In an application scenario of the embodiment, when the target object 90 walks forward and steps off the stage, the object distance will be changed. When the change of the object distance exceeds the corresponding range of the object distance value, step S12 will be re-performed to enter the real-time tracking mode and the target object 90 will be displayed in the captured image with an appropriate size.

Step S17 is to judge whether the target object 90 leaves the second preset range T12c. Step S12 is re-performed to perform the real-time tracking mode when the judgment result is "Yes" and step S15 is re-performed to continue the region tracking mode when the judgment result is "No". In an application scenario of the embodiment, when the target object 90 leaves the second preset range T12c from both sides of the image frame, thereby step S12 will be re-performed to enter the real-time tracking mode to continuously track the target object 90. Accordingly, there will be no situation where the target object cannot be tracked.

It is to be noted that from the above steps, it can be known that when the target object enters the second preset range T12a, T12b, T12c, it will switch to the region tracking mode, and the second preset range T12a, T12b, T12c is existed in the first preset range T11, so the weighting of the second preset range T12a, T12b, T12c is higher than that of the first preset range T11.

Figure 5:
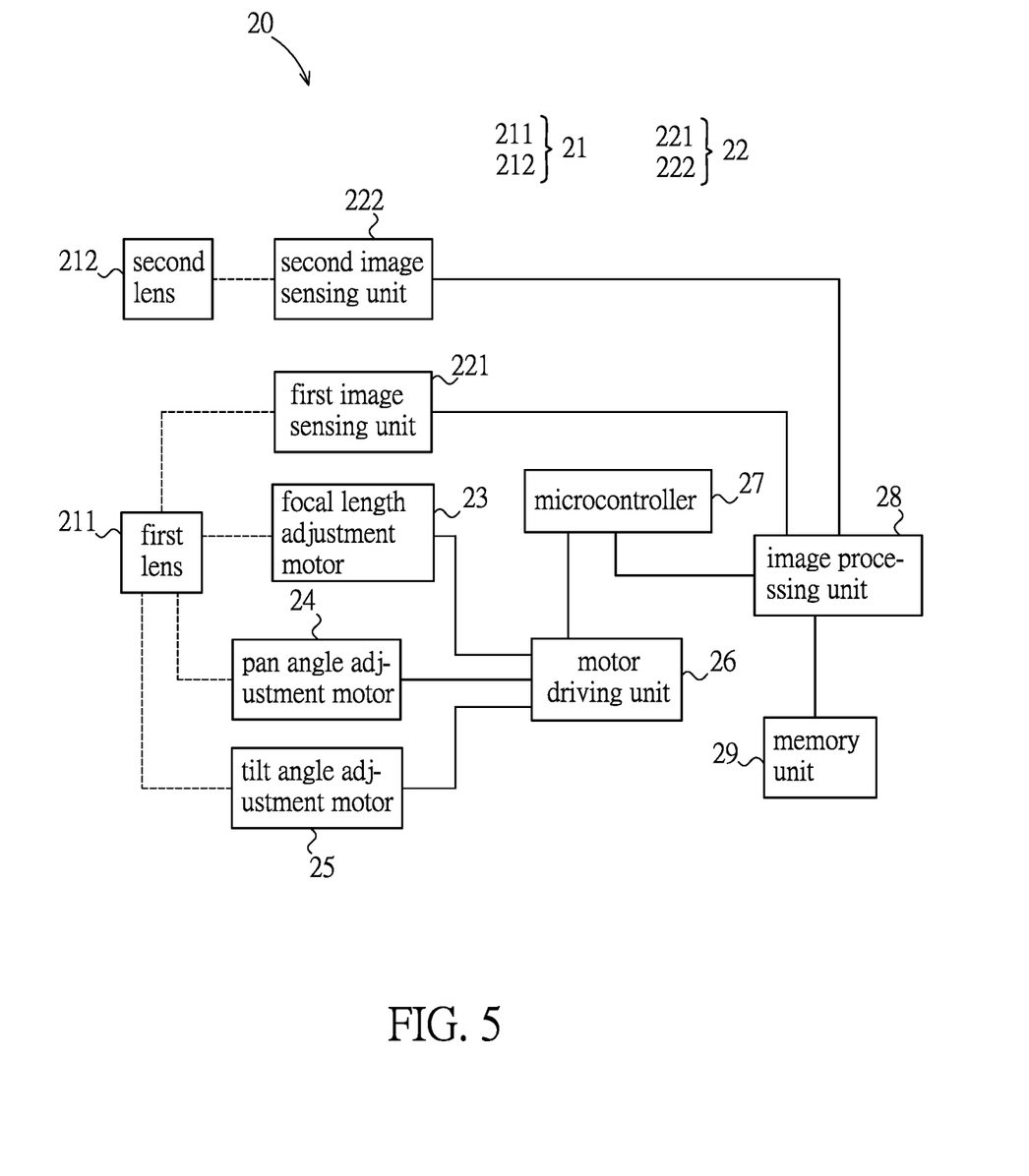
FIG. 5 is a schematic diagram showing a hardware architecture of the automatic tracking system applied to the PTZ camera device according to the second embodiment of the invention.
Figure 6:
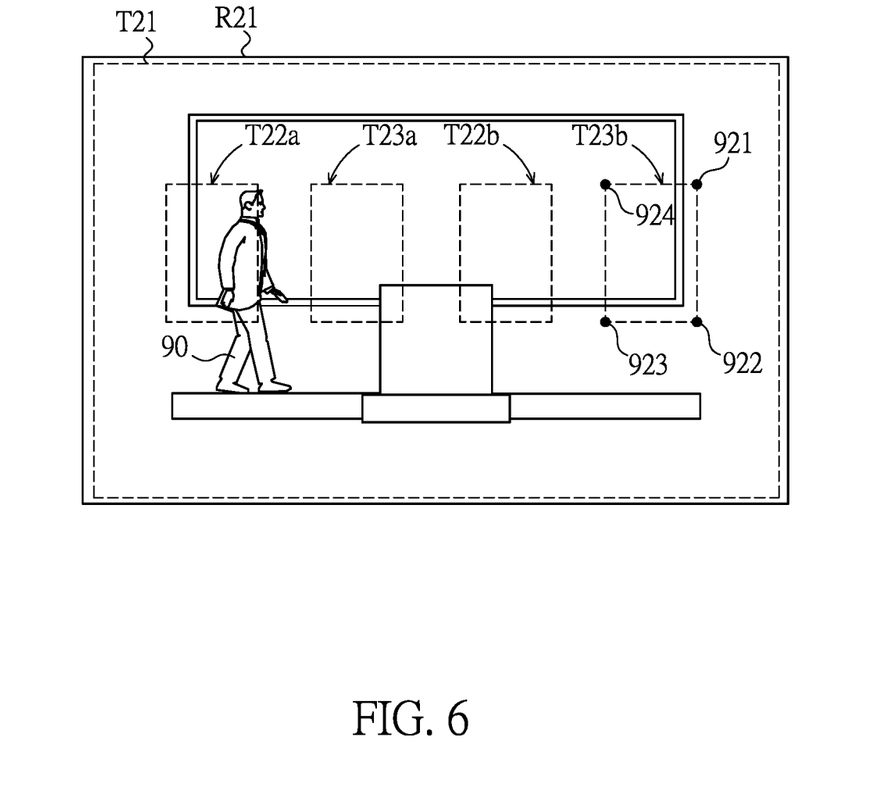
FIG. 6 is a schematic diagram showing an application scenario of the automatic tracking method applied to the PTZ camera device according to the second embodiment.
Figure 7A:
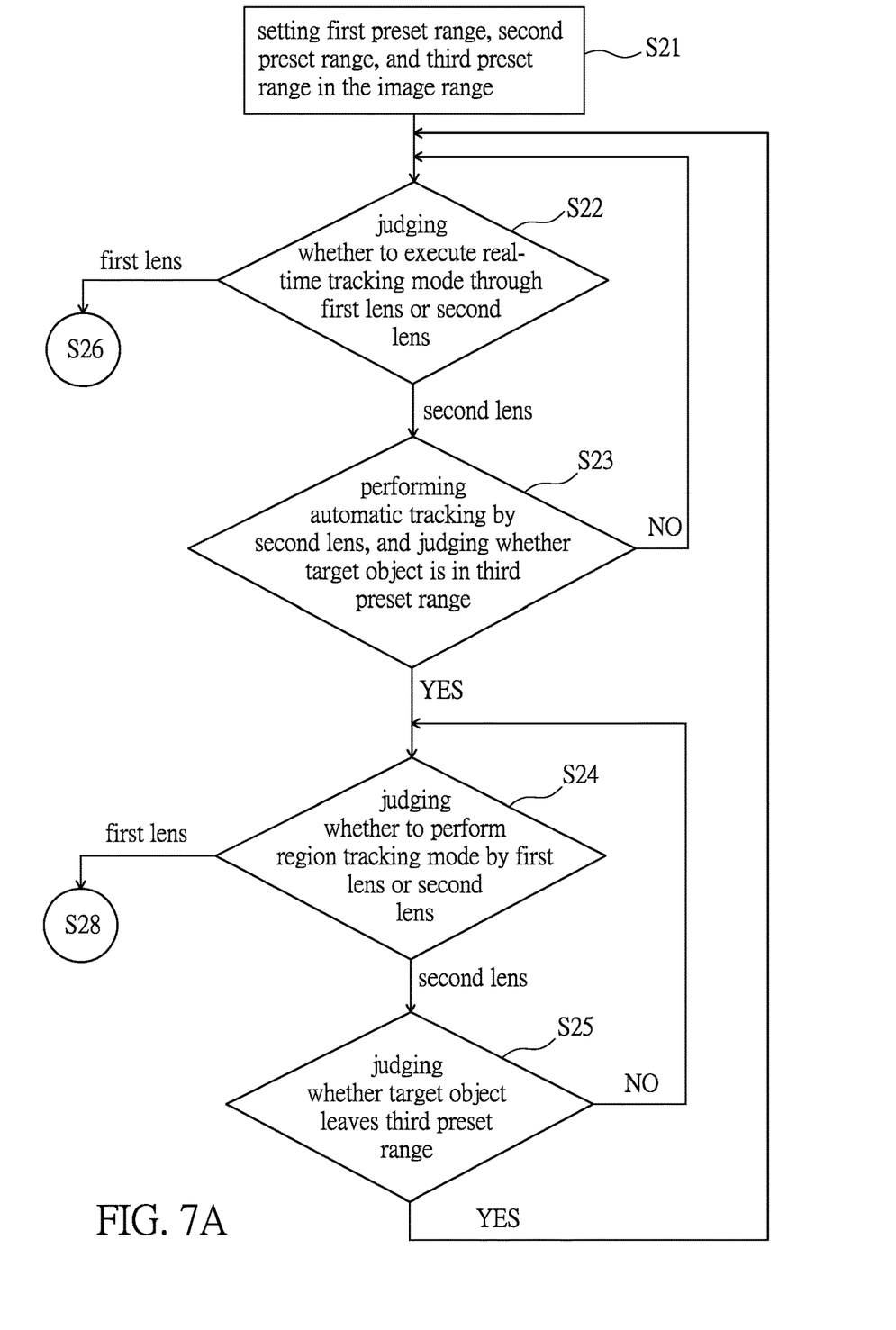
FIG. 7A and FIG. 7B are flowchart showing the automatic tracking method applied to the PTZ camera device according to the second embodiment of the invention.
Figure 7B:
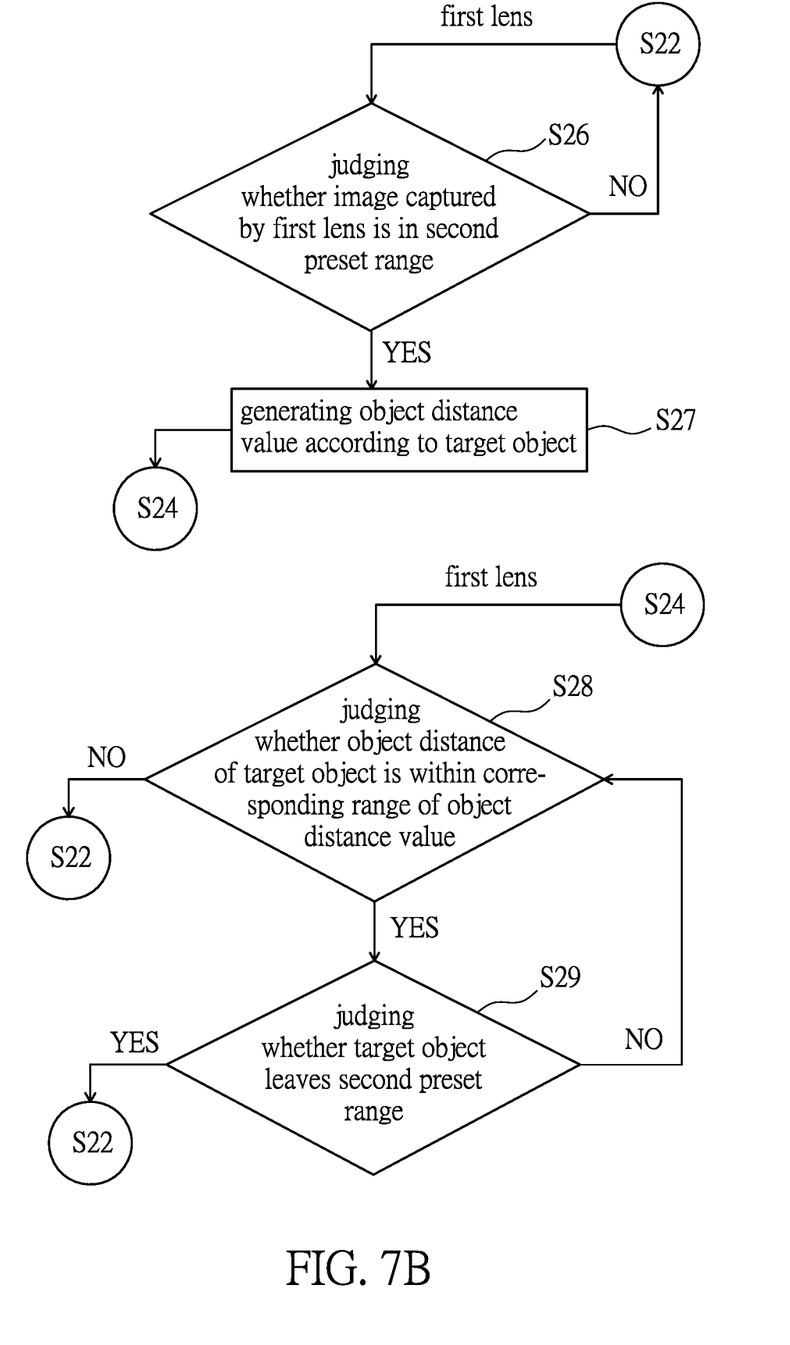

FIG. 5 is a schematic diagram of a hardware architecture of the automatic tracking system applied to the PTZ camera device according to a second embodiment of the present invention. FIG. 6 is a schematic diagram of an application scenario of the automatic tracking method applied to the PTZ camera device according to the second embodiment. FIG. 7A and FIG. 7B are flowcharts of the automatic tracking method applied to the PTZ camera device according to the second embodiment of the present invention.

As shown in FIG. 5, in the second embodiment, an automatic tracking system 20 applied to the PTZ camera device includes a lens set 21, an image sensing unit set 22, a focal length adjustment motor 23, a pan angle adjustment motor 24, a tilt angle adjustment motor 25, a motor driving unit 26, a microcontroller 27, an image processing unit 28, and a memory unit 29.

The lens set 21 includes a first lens 211 and a second lens 212, wherein the first lens 211 is a variable focal length the lens and the second lens 212 is a panoramic lens (or wide-angle lens). The image sensing unit set 22 includes a first image sensing unit 221 and a second image sensing unit 222. The first image sensing unit 221 is disposed corresponding to the first lens 211 and the second image sensing unit 222 is disposed corresponding to the second lens 212.

The first lens 211 is disposed opposite to the first image sensing unit 221, and the light is imaged on the first image sensing unit 221 after passing through the first lens 211 and then recorded. The second lens 212 is disposed opposite to the second image sensing unit 222, and the light is imaged on the second image sensing unit 222 after passing through the second lens 212 and then recorded.

The focal length adjustment motor 23, the pan angle adjustment motor 24, and the tilt angle adjustment motor 25 are respectively coupled to the first lens 211. The focal length of the first lens 211 can be adjusted through the focal length adjustment motor 23. The pan angle adjustment motor 24 can drive the first lens 211 to rotate along the first plane. The tilt angle adjustment motor 25 can drive the first lens 211 to rotate along the second plane. In the embodiment, the first plane is perpendicular to the second plane. More specifically, the first plane is, for example, a ground plane.

The motor driving unit 26 is electrically connected to the microcontroller 27, the focal length adjustment motor 23, the pan angle adjustment motor 24, and the tilt angle adjustment motor 25 respectively. The motor driving unit 26 outputs the corresponding driving signal to the focal length adjustment motor 23, the pan angle adjustment motor 24, and the tilt angle adjustment motor 25 according to a control signal output by the microcontroller 27, and then controls the focal length, horizontal angle, and tilt angle of the first lens 211 respectively. In other embodiments, the focal length adjustment motor 23, the pan angle adjustment motor 24, and the tilt angle adjustment motor 25 may also be individually electrically connected to the corresponding motor driving unit. In other words, each motor may have an independent motor driving unit.

The image processing unit 28 is electrically connected with the first image sensing unit 221, the second image sensing unit 222, the microcontroller 27, and the memory unit 29 respectively. The memory unit 29 can store application programs to be performed, setting data, and algorithms, such as automatic tracking algorithms. The image processing unit 28 is capable of performing the application program stored in the memory unit 29 so as to perform computation or analysis on the image output by the image sensing unit set 22.

It should be noted that the above-mentioned first lens 211, the first image sensing unit 221, the focal length adjustment motor 23, the pan angle adjustment motor 24, the tilt angle adjustment motor 25, the motor driving unit 26, and the microcontroller 27 can constitute a PTZ camera device. In addition, the above-mentioned second lens 212 and the second image sensing unit 222 can constitute a wide-angle camera device. In other embodiments, the PTZ camera device may also include the image processing unit 28 and/or the memory unit 29 in addition to the above units.

The following is the automatic tracking method applied to the PTZ camera device in conjunction with the above-mentioned automatic tracking system 20 to illustrate a second embodiment of the present invention. The second embodiment is also described by taking a teaching occasion applied to a classroom as an example. The automatic tracking system 20 applied to the PTZ camera device is disposed relative to a stage, and the image area covered by the automatic tracking system 20 applied to the PTZ camera device is also shown in FIG. 3. As shown in FIG. 6, the image area R21 is adjusted by the focal length adjustment motor 23, the pan angle adjustment motor 24, and the tilt angle adjustment motor 25 so that the first lens set 211 can capture the maximum range of images. In the embodiment, the maximum-range image is also the same as the maximum-range image that the second lens 212 of the lens set 21 can capture. However, in other embodiments, the maximum-range images that can be captured by the two can also be different.

Please refer to FIG. 5, FIG. 6, FIG. 7A and FIG. 7B, the automatic tracking method of the second embodiment includes steps S21 to S29.

Step S21 is to set a first preset range T21, two second preset ranges T22a, T22b and two third preset ranges T23a, T23b in the image area R21. The second preset ranges T22a, T22b and the third preset ranges T23a, T23b are respectively existed in the first preset range T21. The first preset range T21 is the range to use the real-time tracking mode. The second preset ranges T22a, T22b and the third preset ranges T23a, T23b are the ranges to use the region tracking mode.

The setting methods of the first preset range T21 and the second preset ranges T22a, T22b are substantially the same as those described in the first embodiment, and thus will not be repeated here. The difference is that the image area R21 can also come from the image captured by the second lens 212 alone, and the third preset ranges T23a and T23b can be a set of coordinate parameters corresponding to the second lens 212 respectively. Taking the third preset range T23b as an example, the coordinate parameter includes the X-axis and Y-axis coordinates of four apexes 921, 922, 923, 924, and the coordinate parameter can also be stored in the memory unit 29. It is to be noted that each preset range (including the first preset range T21, the second preset ranges T22a, T22b, and the third preset ranges T23a, T23b) can have a set of motor parameters and a set of coordinate parameters. In other embodiments, each preset range may only have one of the motor parameter and the coordinate parameter. It should be noted that when each preset range has the motor parameter and the coordinate parameter, there is no need to distinguish between the second preset range and the third preset range.

Step S22 is to judge whether to perform the real-time tracking mode through the first lens 211 or the second lens 212. Step S26 is performed when the judgment result is that the first lens 211 is used to perform real-time tracking calculations, and step S23 is performed when the determination result is that the second lens 212 is used to perform real-time tracking calculations.

Step S23 is to perform automatic tracking through the second lens 212, and judge whether the target object 90 is existed in the third preset range T23a, T23b. Step S24 is performed when the judgment result is "Yes", and step S22 is re-performed when the judgment result is "No". In the embodiment, the coordinate parameter of the third preset range T23a, T23b can be converted into the motor parameter of the first lens 211 through the image processing unit 28 and the microcontroller 27 so that the first lens 211 can capture and output the image of the corresponding area.

Step S24 is to judge whether to perform the region tracking mode through the first lens 211 or the second lens 212. Step S28 is performed when the judgment result is that the first lens 211 is used to perform the area tracking calculation, and step S25 is performed when the judgment result is that the second lens 212 is used to perform the area tracking algorithm.

Step S25 is to judge whether the target object leaves the third preset range T23a, T23b. Step S22 is re-performed to perform the real-time tracking mode when the judgment result is "Yes", and step S24 is re-performed to continue the region tracking mode when the judgment result is "No".

Next, step S26 is to judge whether the image captured by the first lens 211 is existed in the second preset range T22a, T22b. Step S27 is performed when the judgment result is "Yes", and step S22 is re-performed when the judgment result is "No".

Step S27 is to generate an object distance value according to the target object 90, and step S24 is performed after storing the object distance value into the memory unit 29. Then step S28 is performed when the judging result of step S24 is that the first lens 211 is used to perform the area tracking algorithm.

Step S28 is to judge whether the object distance of the target object 90 is within a corresponding range of the object distance value. Step S29 is then performed when the judgment result is "Yes", and step S22 is re-performed when the judgment result is "No".

Step S29 is to judge whether the target object 90 leaves the second preset range T22a, T22b. Step S22 is re-performed to perform the real-time tracking mode when the judgment result is "Yes", and step S28 is re-performed to continue the region tracking mode when the judgment result is "No".

Since step S26, step S27, step S28, and step S29 are the same or similar steps as step S13, step S14, step S16, and step S17 of the first embodiment respectively, so no more details.

As mentioned above, the automatic tracking method and the automatic tracking system applied to the PTZ camera device of the present invention perform multiple tracking modes at the same time and collocate the PTZ camera device or further collocate the panoramic lens to flexibly switch between the real-time tracking mode or the region tracking mode depending on the location of the target object. In this way, the performance balance of the software and hardware system can be achieved, and the situation of losing track of the target object can be avoided under the condition of limited system performance.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

What is claimed is:

1. An automatic tracking method applied to the a pan-tilt-zoom (PTZ) camera device, in which a first preset range and a second preset range are set in an image capturing range of the PTZ camera device, comprising:
    performing a real-time tracking mode when a target object exists in the first preset range, and a capture position of a first lens of the PTZ camera device is adjusted following a movement of the target object;
    recording an object distance value and performing a region tracking mode to adjust the capture position of the first lens of the PTZ camera device according to the second preset range and to track the target object within the second preset range when the target object exists in the second preset range; and
    switching the region tracking mode to the real-time tracking mode when the object distance value of the target object is changed.

2. The automatic tracking method of claim 1, wherein performing the real-time tracking mode includes capturing images in the first preset range by the first lens and performing a target recognition from the captured images.

3. The automatic tracking method of claim 1, wherein the object distance value is calculated by the following formula:

$$\text{object distance value} = \text{target area} / \left(2 \times \tan\frac{\text{horizontal field of view}}{2}\right)$$

wherein the target area=((constant×horizontal pixel value)/target width pixel value);
wherein the unit of the constant is meter, and the range is between 0.3 and 0.6;
wherein the target width pixel value is the number of pixels occupied by the target object in the image; and
wherein the horizontal field of view is the horizontal field of view of the first lens.

4. The automatic tracking method of claim 1, wherein the first preset range and the second preset range correspond to a motor parameter, based on which the first lens moves to the capture position corresponding to the target object.

5. The automatic tracking method of claim 1, further comprising:
    capturing an image in the image capturing range by a second lens, and there is a third preset range set in the image capturing range, which corresponds to a coordinate parameter of the second lens.

6. The automatic tracking method of claim 5, further comprising:
    judging whether to perform the real-time tracking mode or the region tracking mode by the first lens or the second lens.

7. The automatic tracking method of claim 5, wherein when the target object exists in the third preset range, the automatic tracking method further comprising:
    converting the coordinate parameter of the third preset range into a motor parameter, based on which the first lens moves to the capture position corresponding to the target object.

8. An automatic tracking system applied to a pan-tilt-zoom (PTZ) camera device, comprising:
    a first lens;
    a first image sensor, which is disposed opposite to the first lens and transmits an image; and
    an image processor, which is electrically connected with the first image sensor, selects to track a target object in a real-time tracking mode or a region tracking mode according to the target object in the image, a preset range where the target object is located, and an object distance value, and outputs a computing information;
    wherein the first lens follows a movement of the target object to dynamically adjust a capture position when the image processor selects the real-time tracking mode;
    wherein the first lens fixes the capture position when the image processor selects the region tracking mode.

9. The automatic tracking system of claim 8, further comprising:
    a microcontroller, which is electrically connected to the image processor, receives and outputs a control signal according to the computing information;
    a motor driver, which is electrically connected to the microcontroller, outputs a driving signal according to the control signal;
    a focal length adjustment motor, which is coupled to the first lens and electrically connected to the motor driver, adjusts the focal length of the first lens according to the driving signal;
    a pan angle adjustment motor, which is coupled to the first lens and electrically connected with the motor driver, drives the first lens to rotate along a first plane; and
    a tilt angle adjustment motor, which is coupled to the first lens and electrically connected with the motor driver, drives the first lens to rotate along a second plane;
    wherein the first plane is perpendicular to the second plane.

10. The automatic tracking system of claim 9, further comprising:
    a second lens; and a second image sensor, which is disposed opposite to the second lens and electrically connected with the image processor, transmits an image captured by the second lens to the image processor, and the image processor selects the real-time tracking mode or the region tracking mode to track the target object according to the image captured by the second lens.

11. The automatic tracking system of claim 9, further comprising:

a memory, which is electrically connected with the image processor, stores the object distance value, a motor parameter corresponding to the preset range, or a coordinate parameter corresponding to the preset range.

* * * * *